March 6, 1928.
C. J. BORDA
LEVELING DEVICE
Filed Dec. 4, 1926
1,661,993
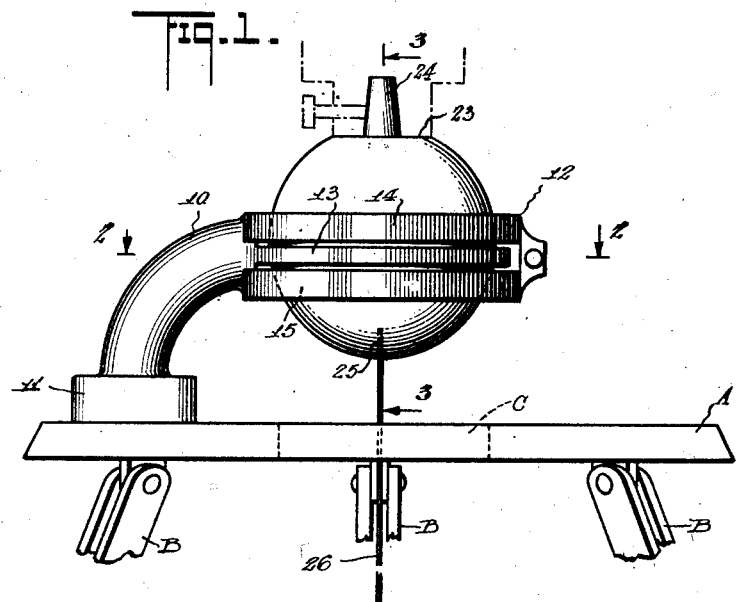
 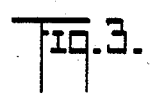
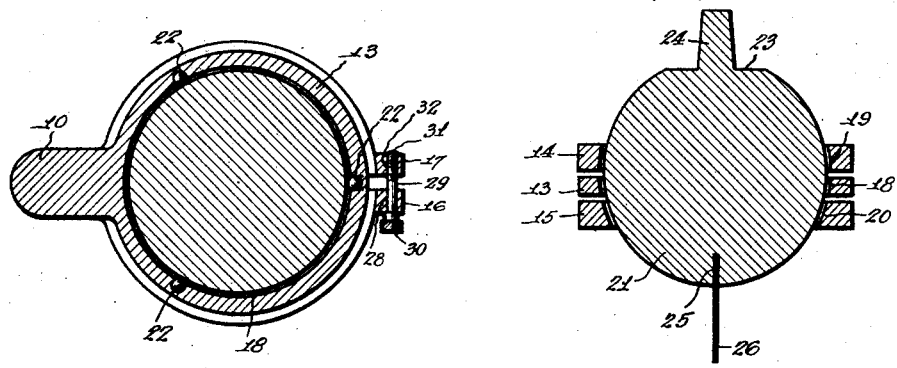
WITNESSES
INVENTOR
Carlos Jaramillo Borda.
BY
ATTORNEYS Patented Mar. 6, 1928.

1,661,993

UNITED STATES PATENT OFFICE.

CARLOS JARAMILLO BORDA, OF BOGOTA, COLOMBIA.

LEVELING DEVICE.

Application filed December 4, 1926. Serial No. 152,640.

This invention relates to leveling devices, and has particular reference to a leveling attachment for instrument supports such as tripods.

Heretofore instruments such as transits, compasses, or similar apparatuses which are mounted on supports, such as tripods, have been leveled by means of spirit levels or the like. This means is open to many objections and hence the present invention comprehends an attachment for instrument supports which constitutes a self-leveling means which positively insures the positioning of the instrument on a level parallel to the true horizon.

The invention furthermore contemplates a leveling attachment of the character set forth, which includes means for locking and retaining the instrument in a leveled position after the true level is attained.

As a further object the invention comprehends a leveling device or attachment of the character set forth which is comparatively simple in its construction and mode of use, inexpensive to manufacture, and which is highly efficient in its purpose.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a side view of the attachment applied to a tripod;

Fig. 2 is a horizontal sectional view taken approximately on the line 2—2 of Fig. 1;

Fig. 3 is a vertical sectional view taken approximately on the line 3—3 of Fig. 1.

Referring to drawings by characters of reference, A designates a tripod head to which the supporting legs B are pivotally attached, the same being constructed in the usual manner.

The leveling attachment consists of a goose-neck bracket 10 having a base 11 secured eccentrically to the tripod head so that the free end portion 12 of the goose-neck is disposed concentrically over the central aperture C of the tripod. The free end portion which is preferably constructed as an integral part of the goose-neck bracket 10, includes a horizontally disposed central or intermediate ring or annulus 13, and upper and lower integral split rings 14 and 15, the free ends of the split portions of which are provided with a pair of outwardly projecting ears 16 and 17 which join and are preferably formed integrally with each end of the upper and lower split ring members 14 and 15. The inner periphery 18 of the central or intermediate ring 13 and the inner peripheries 19 and 20 of the upper and lower split rings are concaved, the radii of the concavity being struck from a common center so as to approximately coincide with a substantially spherical or ball-shaped member or instrument rest 21 positioned within the members 13, 14 and 15. In order to mount the spherical member or ball 21 in the central ring-shaped member or annulus 13 with a minimum of frictional resistance against universal turning movement, the member 13 has mounted therein and slightly projecting from its inner periphery 18, a plurality of circumferentially spaced ball bearings 22. The upper portion of the spherical member or ball 21 is provided with a flattened face 23 from which a concentrically disposed stud or stem 24 projects upwardly to constitute a means for attaching an instrument therewith. The lower end of the ball or spherical member 22 is provided with a threaded aperture 25 disposed diametrically opposite the stem 24 and designed to receive a rod 26 to the lower end of which a weight or plumb bob 27 is attached. The ear 16 is apertured at 28 to receive therethrough the shank 29 of a screw having a knurled or kerfed head 30. The opposite end of the shank is threaded at 31 to engage within the threaded bore 32 of the ear 17, whereby the screw may be employed as a means for contracting the split ring members 14 and 15 to frictionally engage and lock the spherical member or ball 21 against movement.

In practice, the screw 20 is loosened so that the split rings 14 and 15 are out of frictional engagement with the member 21, and it is obvious that the plumb bob or weight 27 will move the member 21 under the action of gravity to dispose the flattened face 23 in a true leveled position with respect to the horizontal. The screw 29 may then be tightened to cause the split ring members 14 and 15 to grip the periphery of the member 21 so as to lock the same in its leveled condition. The instrument is then attached by any suitable means to the stud or stem 24.

From the foregoing it will thus be seen that a simple yet highly efficient leveling attachment for instrument supports has been devised, which automatically effects an absolute or true leveling of an instrument and is provided with means for locking and maintaining the instrument when leveled.

What is claimed is:

1. In a leveling attachment for instruments, the combination of a support having a central aperture in its head, a gooseneck bracket attached to the support head, having its free end overlying the central aperture and formed with an integral annulus and upper and lower integral split ring members, a spherical element mounted in the annulus for free universal movement having a flatened face serving as a seat for the instrument and attaching means at its upper end and a weight suspended diametrically opposite thereto at its lower end for gravitationally leveling the same, an ear connecting respectively the upper and lower split ends of each split ring member, and means engaging said ears for effecting a contraction of the split ring members into frictional peripheral engagement with the spherical element for locking the same against movement.

2. A self-leveling device of the character set forth including a weighted spherical supporting element, and a mounting therefor including a member carrying an annulus and upper and lower split ring members within which the spherical supporting element is mounted, the upper and lower split ring members being normally radially expanded to permit of free universal movement of the weighted spherical supporting element and including means for radially contracting the same to lock the element after the leveling operation.

3. A self-leveling device, including a spherical supporting element having a weight suspended therefrom, and a mounting therefor comprising a member having an integral annulus and integral upper and lower split ring members within which said element is mounted, an ear connecting respectively the upper and lower split ends on each ring member, and means engaging said ears for effecting contraction of the split ring members into frictional peripheral engagement with the spherical element for locking the same against movement.

CARLOS JARAMILLO BORDA.